United States Patent [19]

Chikuma et al.

[11] Patent Number: 4,892,375
[45] Date of Patent: Jan. 9, 1990

[54] FIBER-TYPE LIGHT CONVERSION DEVICE

[75] Inventors: Kiyofumi Chikuma; Sota Okamoto, both of Saitama, Japan

[73] Assignee: Pioneer Electronic Corporation, Tokyo, Japan

[21] Appl. No.: 347,058

[22] Filed: May 4, 1989

[30] Foreign Application Priority Data

May 20, 1988 [JP] Japan ................................ 63-123414

[51] Int. Cl.$^4$ ............................................. G02B 6/32
[52] U.S. Cl. .................................. 350/96.18; 350/432
[58] Field of Search ..................... 350/96.18, 432, 435, 350/96.29, 96.16; 307/425–430

[56] References Cited

U.S. PATENT DOCUMENTS 4,820,029  4/1989  Iwai et al. ........................... 350/432

Primary Examiner—John D. Lee
Assistant Examiner—Phan T. Heartney
Attorney, Agent, or Firm—Foley & Lardner, Schwartz, Jeffery, Schwaab, Mack, Blumenthal & Evans

[57] ABSTRACT

A fibre-type light conversion device comprises a fibre-type conversion element for changing the wavelength of an incident light and a converging lens for converging said incident light whose wavelength is changed by the conversion element. The device is characterized in that the converging lens is a single lens having an aspherical surface configured such that a distance Zi from a plane perpendicular to an optical axis of the lens and passing an extremity of the lens to a point on the aspherical surface having a height Y from the optical axis is expressed by the following equation $$Zi = \frac{C_iY^2}{1 + \sqrt{1 - K_iC_i}} + A_1(i)Y + A_4(i)Y^4 + A_6(i)Y^6 + A_8(i)Y^8 + A_{10}(i)Y^{10}$$

where $C_i$ is an inverse number of the radius of curvature of the "i"th surface at an intersecting point between the "i"th surface and the optical axis, $K_i$, $A_1(i) \sim A_{10}(i)$ are constants, and Y is the height from the optical axis to the refracting surface.

1 Claim, 2 Drawing Sheets

LIGHT SECOND HARMONIC WAVE RING

LIGHT SECOND HARMONIC WAVE RING

FIBER-TYPE LIGHT CONVERSION DEVICE

BACKGROUND OF THE INVENTION

1. Field of the Invention

The present invention relates to a fibre-type light conversion device.

2. Description of Background Information

An optical pickup is known by which high density writing and reading of information on and from a disc are enabled by changing the wavelength of a laser beam emitted from a laser source to a half the original wavelength by means of a light conversion device (reference is directed to Japanese Patent Application Laid-Open No. 61-50122).

As the light conversion device for use in this type of pickup, there is an optical fibre-type SHG (Second Harmonics Generator) using a second-order non-linear optical effect. A phase matching due to the Cerenkov radiation system is adopted in the optical fibre type SHG. With this system, it is possible to generate a second harmonic wave (referred to as SH wave hereinafter) whose phase matching condition is attained almost automatically. The general concept of this device is shown in FIGS. 1A and 1B.

In FIG. 1A, when the fundamental wave mode is propagated through the core with the effective reflective index of N ($\omega$), the non-linear polarizing wave generating the SH wave is also propagated at the same phase velocity C/N ($\omega$) (C is the speed of light). It is assumed that this non-linear polarizing wave produces the SH wave in a direction making an angle $\theta$ with respect to the direction of the wave guide at a point A, and generates the SH wave in the direction of $\theta$ as before at a point B, after the elapse of a unit time. If the SH wave generated at the point A propagates through the clad and reaches to a point C after the elapse of the unit time and the angle $\theta$ is such an angle that lines AC and BC are perpendicular to each other, then the plane of the SH wave which is generated from the non-linear polarized wave becomes equal to BC, and as a result, a coherent SH wave will be generated.

The condition of the phase matching is, according to the figure, as follows:

$$N(\omega) = N_{clad}(2\theta) \cos \omega \quad (1)$$

where $N_{clad}(2\omega)$ is the refractive index of the clad for the SH wave.

This in turn gives, $$N(\omega) = N_{clad}(2\omega) \quad (2)$$

The above equation means that the SH is generated automatically in the direction where the phase matching is performed when at least the condition mentioned by the equation (2) is satisfied. Generally, with the refractive indices of the clad and core for the fundamental wave being $n_{clad}(\omega)$ and $n(\omega)$ and with air as the overlayer, the condition for the fundamental wave to propagate through the core as a mode is expressed as follows:

$$N_{clad}(\omega) < N(\omega) < n(\omega) \quad (3)$$

Wavelength dispersion of the clad's refractive index will now be considered. Since $n_{clad}(\omega) < n_{clad}(2\omega)$, the equation (2) is satisfied for all of the fundamental wave modes irrespectively of the diameter of the core so far as the following expression (4) is satisfied.

$$N_{clad}(\omega) < N(\omega) < n_{clad}(2\omega) \quad (4)$$

Moreover, there are fundamental modes satisfying the equation (2) in a certain range of the diameter of the core even under the following condition.

$$N_{clad}(\omega) < n_{clad}(2\omega) < n(\omega)$$

The second harmonic wave generated in this way is propagate in a clad mode as illustrated in FIG. 1B in which total reflection occurs repeatedly at the boundary between the clad and air. Then, the second harmonic wave is emitted in conical shape from the end of fibre in directions making an angle $\theta$ relative to the fibre's direction. The equiphase front of the second harmonic wave emitted in this way is in a conical surface with an axis on the central axis of the fibre.

In order to utilize the second harmonic wave as a light beam for writing and reading information on and from a recording disc as mentioned before, it is necessary to converge the light emerged from the light conversion device on the recording surface of the disk in the form of a small light spot. However, since the equiphase front of the emerging light is in the conical form, it is not possible to converge the emergent light to a degree near to a diffraction limit using a converging lens system made by conventional spherical lenses or aspherical lenses.

Therefore, as illustrated in FIG. 2, it is conceivable to dispose a conical prism 20 with a conical surface in the optical path of the beam emitted from the conversion device 10, and the conical equiphase front can be converted to a planer equiphase front by collimating the second harmonic wave (making it parallel) by means of the function of the conical prism 20. With this arrangement, it becomes possible to converge the light to the diffraction limit by means of a conventional converging lens.

However, if it is attempted to use the conical prism 20 in addition to the conventional converging lens, there arises a problem in constructing an optical pickup using the light conversion device 10 for example, that the structure becomes complicated as the number of optical parts increases. Furthermore, there will be a disadvantage of high cost in such a case.

OBJECT AND SUMMARY OF THE INVENTION

The present invention has been made in view of the above-described point, and an object of the present invention is to provide a fibre-type light conversion device which is adapted such that the second harmonic wave is converged to a degree near the diffraction limit without increasing the number of parts.

The fibre-type light conversion device according to the present invention has a construction in which the converging lens for converging the light whose wavelength has been changed by the light conversion device consists of a single lens having an aspherical surface which is a general tenth-order aspherical surface with a first order term (height from the optical axis to the aspherical surface) added thereto.

DETAILED DESCRIPTION OF THE PREFERRED EMBODIMENT

The preferred embodiment of the present invention will be explained with reference to the accompanying drawings hereinafter.

Figure 1A:
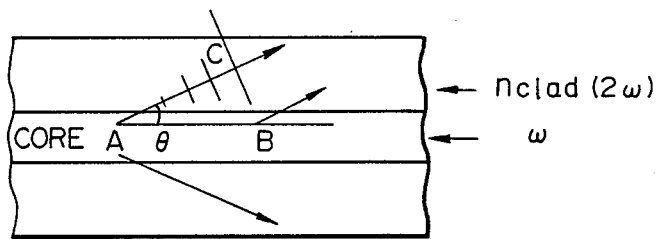
FIGS. 1A and 1B are diagrams for explaining the concept of Cerenkov radiation system phase matching SHG.
Figure 1B:
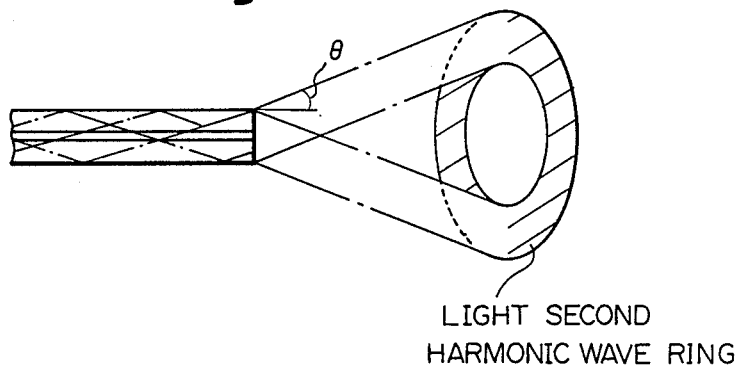
Figure 2:
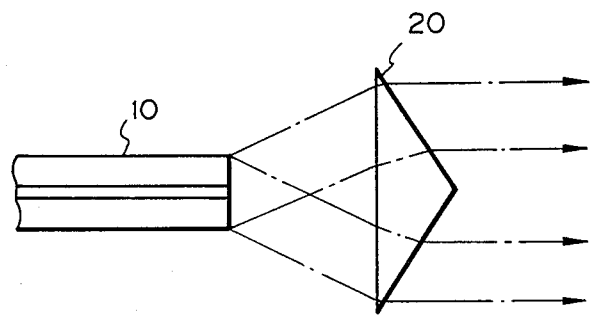
FIG. 2 is a diagram for explaining the concept of collimating the second harmonic wave by means of a conical prism.
Figure 3:
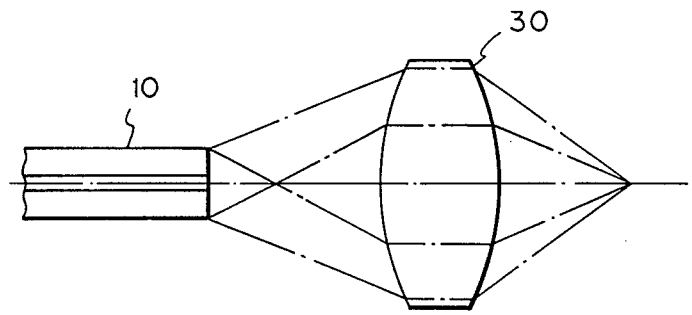
FIG. 3 is a diagram showing the structure of an embodiment of the fibre-type light conversion device according to the present invention.

In FIG. 3, a second order light which is a second harmonic wave emitted from a fibre-type light conversion device 10 is received by a converging lens 30 in which the incident light is converged to a diffraction limit. The converging lens 30 consists of a single lens having two refracting surfaces. One of the two refracting surfaces is configured to satisfy the following equation representing a general tenth-order aspherical surface with a first order term (i.e., the height from the optical axis to the aspherical surface) added thereto. Specifically, the distance $Z_i$ from a plane perpendicular to the optical axis and passing an extremity of the lens to a point on the aspherical surface having a height Y from the optical axis is expressed by the following equation.

$$Z_i = \frac{C_i Y^2}{1 + \sqrt{1 - K_i C_i}} + A_1(i)Y + A_4(i) Y^4 + A_6(i) Y^6 + A_8(i) Y^8 + A_{10}(i) Y^{10}$$

where $C_i$ is an inverse number of the radius of curvature of the "i"th surface at the intersecting point between the "i"th surface and the optical axis, $K_i$, $A_1(i) \sim A_{10}(i)$ are constants, and Y is the height from the optical axis to the refracting surface.

Using this converging lens 30, the second harmonic wave (secondary light) with a conical equiphase front whose wavelength has been changed by means of the fibre-type light conversion device 10 can be converged near to the diffraction limit, only by using the single lens.

Figure 4:
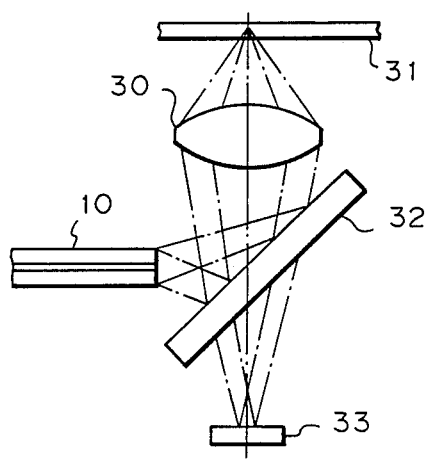
FIG. 4 is a structural diagram of an optical pickup which includes the light conversion device shown in FIG. 3.

The fibre-type light conversion device according to the present invention in which the converging lens 30 described above is included can be applied to an optical pickup for example. As illustrated in FIG. 4, an optical pickup by which writing and reading of information on and from a disk are enabled at higher density is configured without using any additional optical part. In FIG. 4, the reference numeral 31 denotes a disk, 32 denotes a half mirror for reflecting the second harmonic wave from the fibre-type light conversion device 10 to a converging lens 30 and for transmitting light incident from the converging lens 30, and 33 denotes a light detector for detecting the light through the half mirror 32.

As will be appreciated from the foregoing description, the fibre-type light conversion device according to the present invention is constructed such that the converging lens for converging the light whose wavelength has been changed by the light conversion element consists of a single lens having an aspherical surface of a general tenth-order aspherical surface with a first-order term added thereto. Therefore, it is possible to converge the second harmonic wave to a degree near to the diffraction limit by means of a single lens without increasing the number of parts.

What is claimed is:

1. A fibre-type light conversion device comprising a fibre-type conversion element for changing the wavelength of an incident light, and a converging lens for converging said incident light whose wavelength is changed by said conversion element, wherein said converging lens is a single lens having an aspherical surface configured such that a distance $Z_i$ from a plane perpendicular to an optical axis of said lens and passing an extremity of said lens to a point on said aspherical surface having a height Y from the optical axis is expressed by the following equation $$Z_i = \frac{C_i Y^2}{1 + \sqrt{1 - K_i C_i}} + A_1(i)Y + A_4(i) Y^4 + A_6(i) Y^6 + A_8(i) Y^8 + A_{10}(i) Y^{10}$$

where $C_i$ is an inverse number of the radius of curvature of an "i"th surface at an intersecting point between the "i"th surface and the optical axis, $K_i$, $A_1(i) \sim A_{10}(i)$ are constants, and Y is the height from the optical axis to the refracting surface of said lens.

* * * * *